(12) United States Patent
Sharma et al.

(10) Patent No.: US 9,047,149 B2
(45) Date of Patent: Jun. 2, 2015

(54) THROTTLING MESSAGE PRODUCERS BASED ON TOTAL HEAP USAGE OF A MESSAGING ENGINE

(75) Inventors: Urwashi Sharma, Bangalore (IN); Kavitha Suresh Kumar, Bangalore (IN); Lohitashwa Thyagaraj, Bangalore (IN); Venugopala K. Vemula, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 463 days.

(21) Appl. No.: 13/462,929

(22) Filed: May 3, 2012

(65) Prior Publication Data

US 2013/0298118 A1     Nov. 7, 2013

(51) Int. Cl.
*G06F 9/455*     (2006.01)
*G06F 9/46*      (2006.01)
*G06F 9/54*      (2006.01)

(52) U.S. Cl.
CPC .......... *G06F 9/546* (2013.01); *G06F 2209/504* (2013.01); *G06F 2209/547* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 7,689,695 B2 | 3/2010 | Astley et al. | |
| 7,818,386 B2 | 10/2010 | Surlaker et al. | |
| 2007/0157213 A1* | 7/2007 | Koegel | 719/315 |
| 2008/0120622 A1* | 5/2008 | Follis et al. | 718/105 |

OTHER PUBLICATIONS

"Oracle Fusion Middleware", Oct. 2009.*
Tim Fox, "HornetQ Features", Red Hat, Inc., community.jboss.org/wiki/HornetQFeatures; Aug. 7, 2009.
Oracle, "Oracle Fusion Middleware Performance and Tuning for Oracle WebLogic Server 11g Release 1 (10.3.1) Part No. E13814-02", docs.oracle.com/cd/E15523_01/web.1111/e13814/jmstuning.htm#PERFM312; 2009.
The Apache Software Foundation, "Apache ActiveMQ™—Producer Flow Control", http://activemq.apache.org/producer-flow-control.html; Nov. 3, 2010 (date located through web.archive.org/web/20101103035023/http://activemq.apache.org/producer-flow-control.html?).

(Continued)

*Primary Examiner* — Mengyao Zhe
*Assistant Examiner* — Bradley Teets
(74) *Attorney, Agent, or Firm* — Thomas E. Lees, LLC

(57) ABSTRACT

A method for a messaging engine to control messaging within a virtual machine having a heap includes creating a list of destinations associated with a messaging engine and receiving parameters associated with the heap. The message production rates are controlled using the parameters and heap usage. For example, the parameters may include a lower limit that indicates that message production should be decreased (i.e., throttled back) and a step-down value. Using the lower limit and the step-down value, intermediate throttle-back thresholds are created, and when the heap usage transitions from below one of the intermediate throttle-back thresholds to above the intermediate throttle-back threshold, the message production rate is decreased. Further, other parameters may include an upper limit and a step-up value, which are used to determine intermediate throttle-up thresholds that indicate when the message production rate may be increased (i.e., throttled up).

18 Claims, 10 Drawing Sheets

(56) References Cited

OTHER PUBLICATIONS

The Apache Software Foundation, "Apache Camel: Route Throttling Example", camel.apache.org/route-throttling-example.html; May 26, 2010 (date located through http://web.archive.org/web/20100526002313/http://camel.apache.org/route-throttling-example.html).

Oracle Corporation, "Throttling Producers (Java CAPS JMS Reference)", docs.oracle.com/cd/E19509-01/820-2239/bpade/index.html; 2010.

Novell, Inc., "Basic Server Configuration", http://www.novell.com/documentation/extend52/Docs/help//MP/jms/admin/config.html; Aug. 20, 2004 (date located through web.archive.org/web/20040820185815/http://www.novell.com/documentation/extend52/Docs/help/MP/jms/admin/config.html).

* cited by examiner

US 9,047,149 B2

THROTTLING MESSAGE PRODUCERS BASED ON TOTAL HEAP USAGE OF A MESSAGING ENGINE

BACKGROUND

Various aspects of the present invention relate generally to managing messaging on an application server in a virtual machine environment.

An application server is a component-based product that resides on the middle tier of a server-centric architecture. All J2EE (Java 2 Platform, Enterprise Edition) application servers run within a Java virtual machine (JVM), which includes a heap. When communicating between two or more clients, a messaging engine is used to facilitate messaging between the clients. A destination is an object the client uses to specify the target of messages it produces and the source of messages it consumes. In point-to-point messaging, one destination communicates directly with another destination (i.e., each produced message has only one consumer). In publish/subscribe (i.e., pub/sub) messaging a destination produces messages (i.e., producer) and multiple destinations (i.e., consumers) can subscribe to the producer to consume the published messages. Most messaging engines support both the point-to-point and pub/sub domains.

BRIEF SUMMARY

According to aspects of the present invention, a messaging engine controls messaging within a virtual machine having a heap. The messaging engine creates a list of destinations associated with a messaging engine and receives parameters associated with the heap. The messaging engine determines total heap usage and based on those parameters and the total heap usage, controls message production rates of producers associated with the destinations.

DETAILED DESCRIPTION

In this document, the word "throttle" as a verb refers to slowing down message production. Thus, the phrases "throttle-back" and "throttle-down" mean to restrict message production, while "throttle-up" means to allow message production at a higher rate than previously allowed.

In a J2EE environment, a Java virtual machine running a J2EE application server includes a heap. Aspects of the present invention uses the total heap usage along with parameters associated with the heap to determine a throttling rate for producers associated with a messaging engine. The total heap usage is the amount of the heap that is currently being used, and the parameters associated with the heap include parameters such as an upper limit, a lower limit, a step-up value, a step-down value, and a time window. The message engine throttles the producers based on which consumers those producers feed by restricting the rate at which the messaging engine receives messages from the producers.

In an exemplary implementation, when the total heap usage rises above a designated lower limit, the messaging engine throttles back at least some of the message producers, and when the total heap usage is over a designated upper limit, the messaging engine stops accepting all messages from message producers. Along the way from the lower limit to the upper limit, the messaging engine can throttle back message production at certain points.

Moreover, when the total heap usage falls below the upper limit, the messaging engine throttles up at least some of the message producers, and when the total heap usage is below the lower limit, the messaging engine removes any throttling restrictions on message producers. Along the way from the upper limit to the lower limit, the messaging engine can throttle back message production at certain points.

Figure 1:
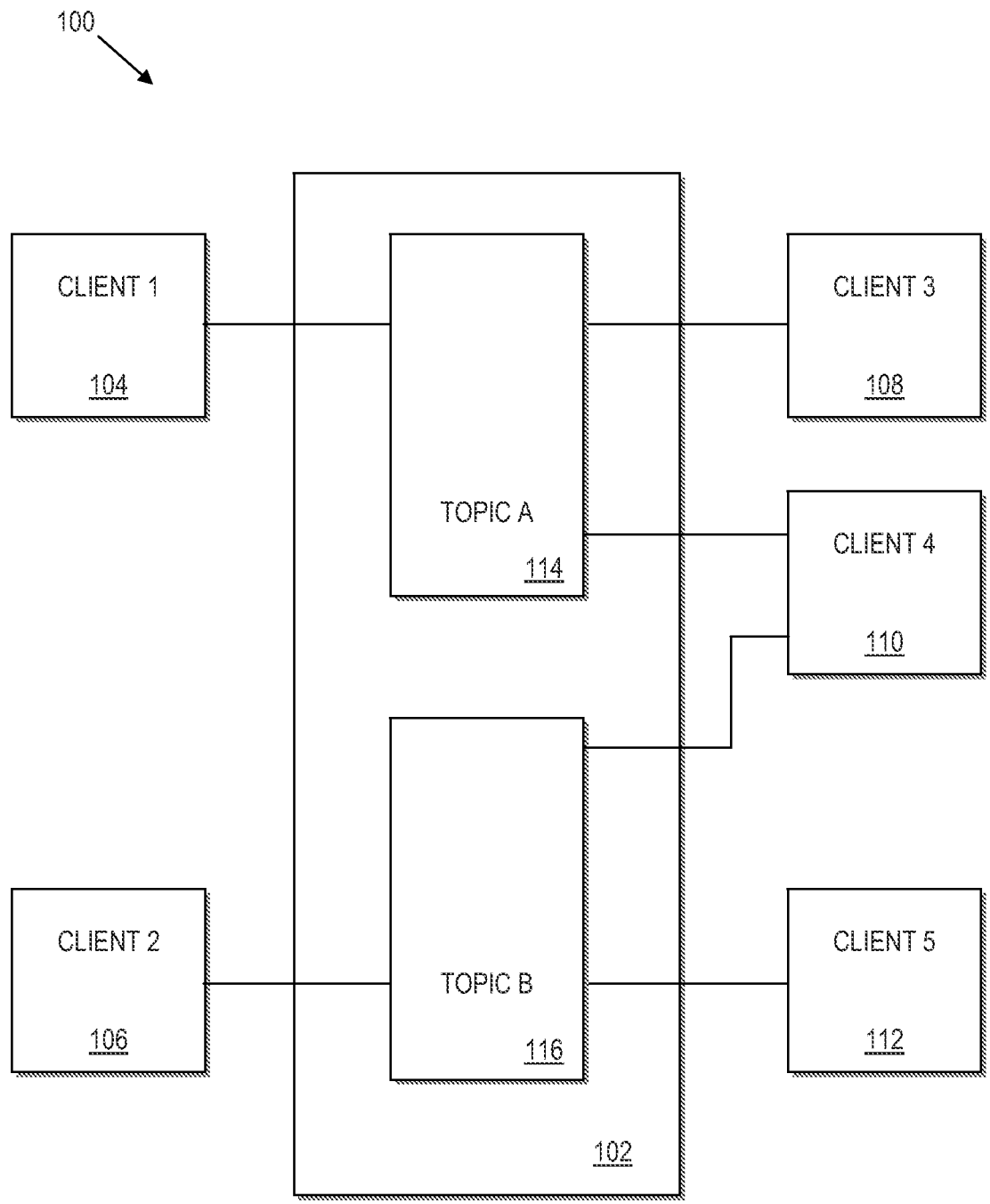
FIG. 1 is a block diagram illustrating a messaging engine coupled to several destinations, according to various aspects of the present invention.

Turning to the figures and in particular to FIG. 1, a block diagram of an exemplary messaging system 100 is shown, which includes a messaging engine 102. The exemplary messaging system 100 is illustrated as supporting five destinations (i.e., clients), 104, 106, 108, 110, and 112 and two topics: Topic A 114 and Topic B 116 for purposes of clarity of discussion herein. In practice, the messaging engine 102 can support numerous destinations and numerous topics.

In the illustrated example, the first two clients 104, 106 produce messages for the topics 114, 116 respectively. The third client 108 subscribes to Topic A 114; the fourth client 110 subscribes to both Topic A 114 and Topic B 116; and the fifth client 112 subscribes to Topic B 116. Thus, when the first client 104 publishes (i.e., produces) a message for Topic A 114, both the third client 108 and the fourth client 110 consume the message. Analogously, when the second client 106 publishes (i.e., produces) a message for Topic B 116, both the fourth client 110 and the fifth client 112 consume the message.

Thus, in the illustrated example, the first client 104 is the only producer that produces messages for the third client 108, the first client 104 and the second client 106 are both producers that produce messages for the fourth client 110, and the second client 106 is the only producer that produces messages for the fifth client 112. According to aspects of the present invention, the messaging engine 102 throttles the producers, e.g., client 104 and client 106, on a per-destination basis based on the total heap usage, as explained below.

Figure 2:
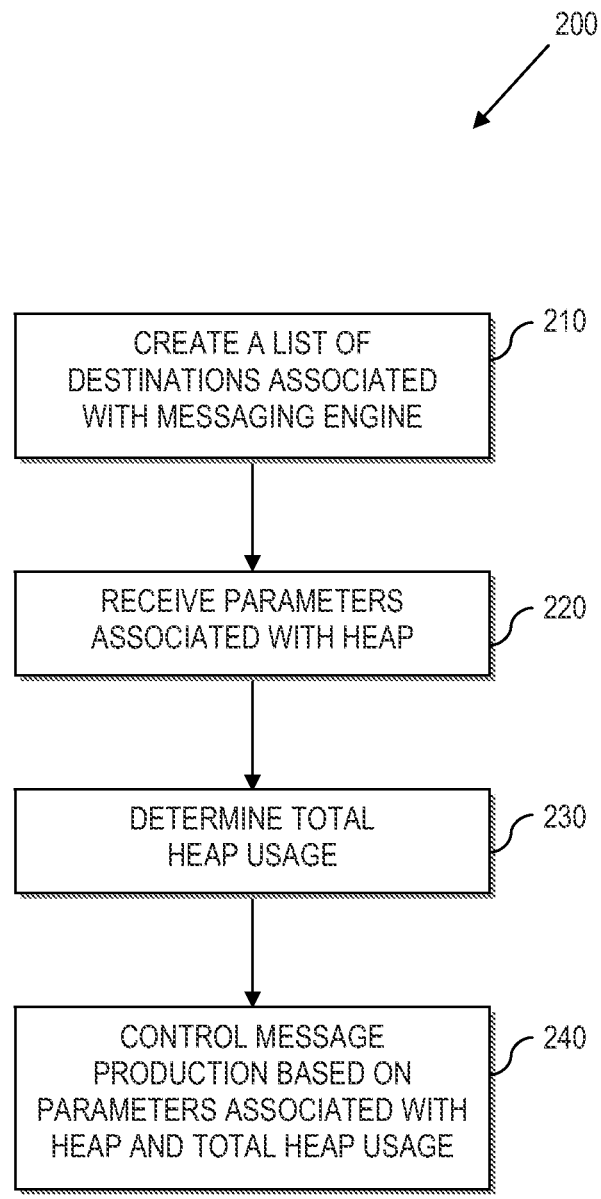
FIG. 2 is a flowchart illustrating an overall flow of throttling producers based on total heap usage, according to various aspects of the present invention.

Referring now to FIG. 2, an overall flow of a method 200 for a messaging engine to control message production within a messaging system is shown. At 210, the messaging engine creates a list of destinations associated with the messaging system. Thus, if a messaging engine has five associated destinations, then the list contains up to five destinations. Creating the list of destinations is described in more detail below in reference to FIG. 3.

At 220, the messaging engine receives parameters associated with the heap. These parameters can include parameters such as a lower limit, an upper limit, a step-up value, and a step-down value. In an exemplary embodiment, the parameters also include a window time that dictates an amount of time used to determine throughput values for later calculations associated with FIGS. 8 and 9, below. Receiving parameters is described in more detail in reference to FIGS. 4-6 below.

At 230, the messaging engine determines the total heap usage. In some embodiments the messaging engine is passed this information directly, while in other embodiments, the messaging engine derives the total heap usage from other information.

At 240, the messaging engine controls message production based on the parameters associated with the heap and the total heap usage. This element is explained in greater detail with reference to FIGS. 7-9 below.

As with all of the flowcharts in this document, the elements 210, 220, 230, 240 of the process 200 of FIG. 2 do not necessarily need to be performed in the order shown in the flowchart. Also, some of the elements may be performed in parallel (i.e., at the same time).

Figure 3:
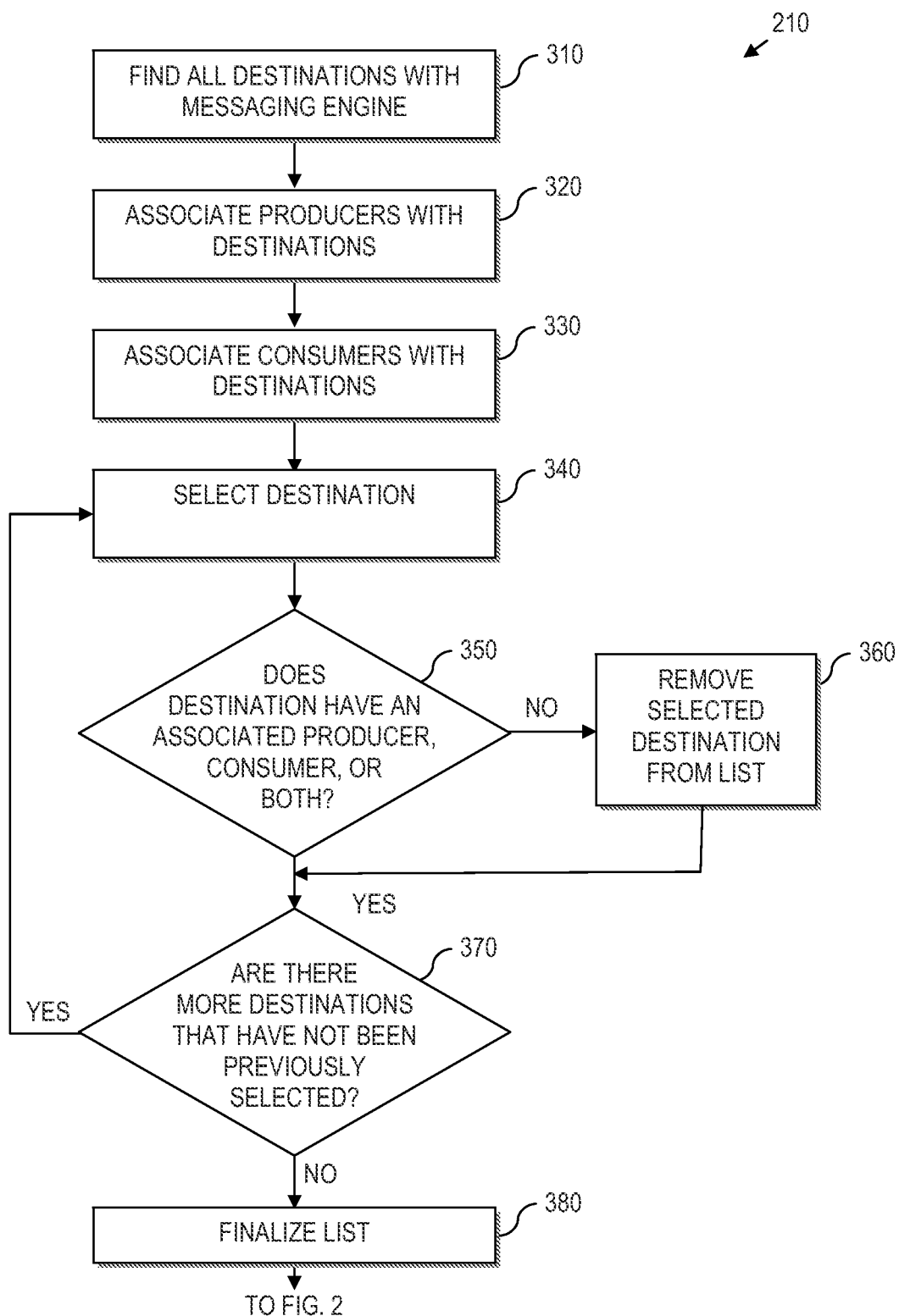
FIG. 3 is a flowchart illustrating a process for creating a list of destinations of the overall flow of FIG. 2, according to various aspects of the present invention.

Referring to FIG. 3, an exemplary detailed flowchart depicting a process for creating a list of destinations associated with the messaging engine (element 210) is shown. At 310, the messaging engine finds all of the destinations that are associated with the messaging engine. Thus, if there are five destinations associated with the messaging engine as illustrated in the exemplary system of FIG. 1, the names of these five destinations are found at 310.

At 320, the messaging engine associates producers with the destinations. For example, the messaging engine registers the producers with specific destinations. The producers are registered and stored on a per destination basis.

At 330, the messaging engine associates consumers with the destinations. For example, the messaging engine registers the consumers with specific destinations. At 340, the messaging engine selects a destination from the list and at 350 determines if the selected destination has an associated producer or consumer. If the selected destination does not have an associated consumer or producer, then at 360 the destination is removed from the list and the messaging engine proceeds to 370. If the selected destination has an associated producer, consumer, or both, then the messaging engine proceeds directly to 370.

At 370, the messaging engine determines whether there are more destinations that have not been selected. If there are more destinations that have not been selected, then the messaging engine proceeds back to 340 and selects a previously non-selected destination and proceeds through 340-370 until all destinations have been selected, as described above. Once all destinations have been selected and run through 340-370, the messaging engine finalizes the list at 380, having removed all of the destinations with no associated consumer or producer.

Other methods for creating the list of destinations may alternatively be used. For example, instead of creating a list of all destinations and removing the destinations that do not have an associated consumer or producer, the messaging engine can append only those destinations that have an associated producer, consumer, or both. The result in both cases would be identical.

As with all of the flowcharts in this document, the elements 310-380 of the process 210 of FIG. 3 do not necessarily need to be performed in the order shown in the flowchart. Also, some of the elements may be performed in parallel (i.e., at the same time).

Figure 4:
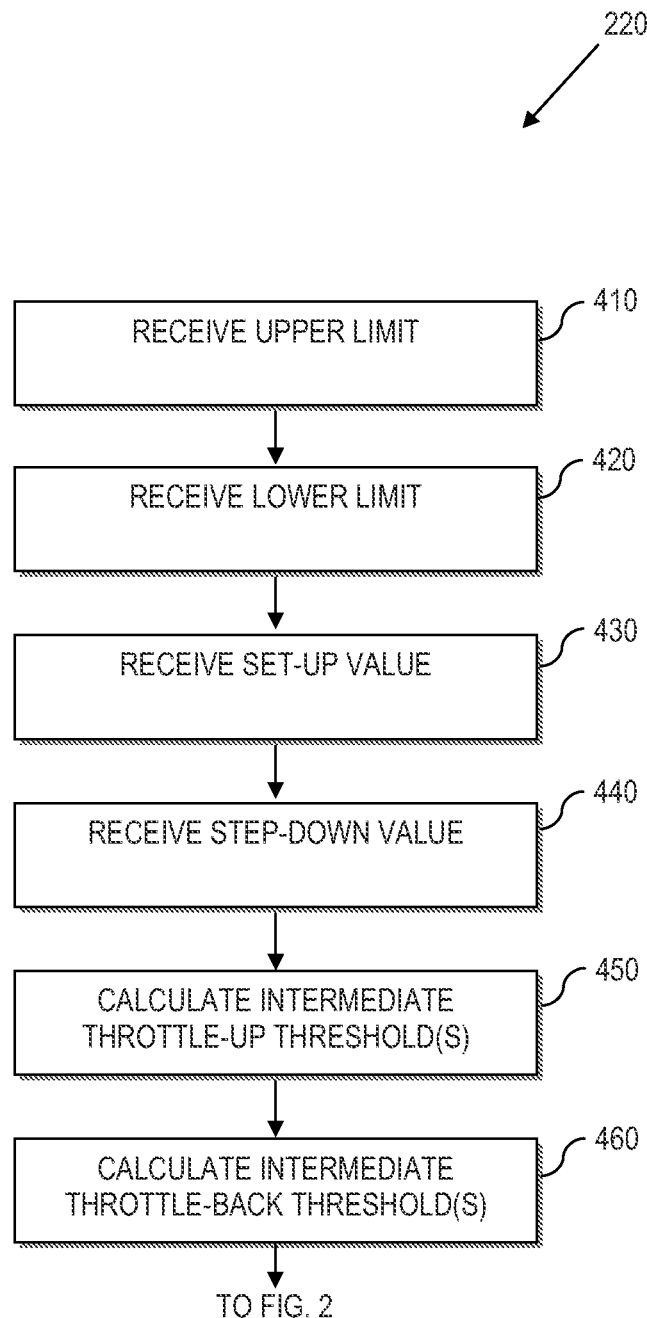
FIG. 4 is a flowchart illustrating a process for receiving parameters associated with a heap of the overall flow of FIG. 2, according to various aspects of the present invention.

Referring to FIG. 4, an exemplary detailed flowchart depicting a process for receiving parameters associated with the heap (element 220) is shown. At 410, the messaging engine receives an upper limit, which indicates when the messaging engine should cut off all messaging. At 420, the messaging engine receives a lower limit, which indicates when the messaging engine should throttle-back at least some messaging. At 430 and 440, the messaging engine receives a step-up value and a step-down value, respectively.

The limits and values mentioned above may be received as absolutes or they may be derived from other information. For example, the messaging engine may receive an upper limit of 1000 Megabytes (MB), a lower limit of 700 MB, a step-up value of 20 MB, and a step-down value of 20 MB. As another example, the messaging engine may receive a total heap size of 2000 MB, an upper limit of 75% of the total heap size, a lower limit of 50% of the total heap size, a step-up value of 10% of the difference between the upper limit and the lower limit, and a step-down value of half of the step-up value.

At 450, the messaging engine calculates intermediate throttle-up thresholds, and at 460, the messaging engine calculates intermediate throttle-back thresholds. These calculations are described in greater detail in reference to FIGS. 5 and 6 respectively.

As with all of the flowcharts in this document, the elements 410-460 of the process 220 of FIG. 4 do not necessarily need to be performed in the order shown in the flowchart. Also, some of the elements may be performed in parallel (i.e., at the same time).

Figure 5:
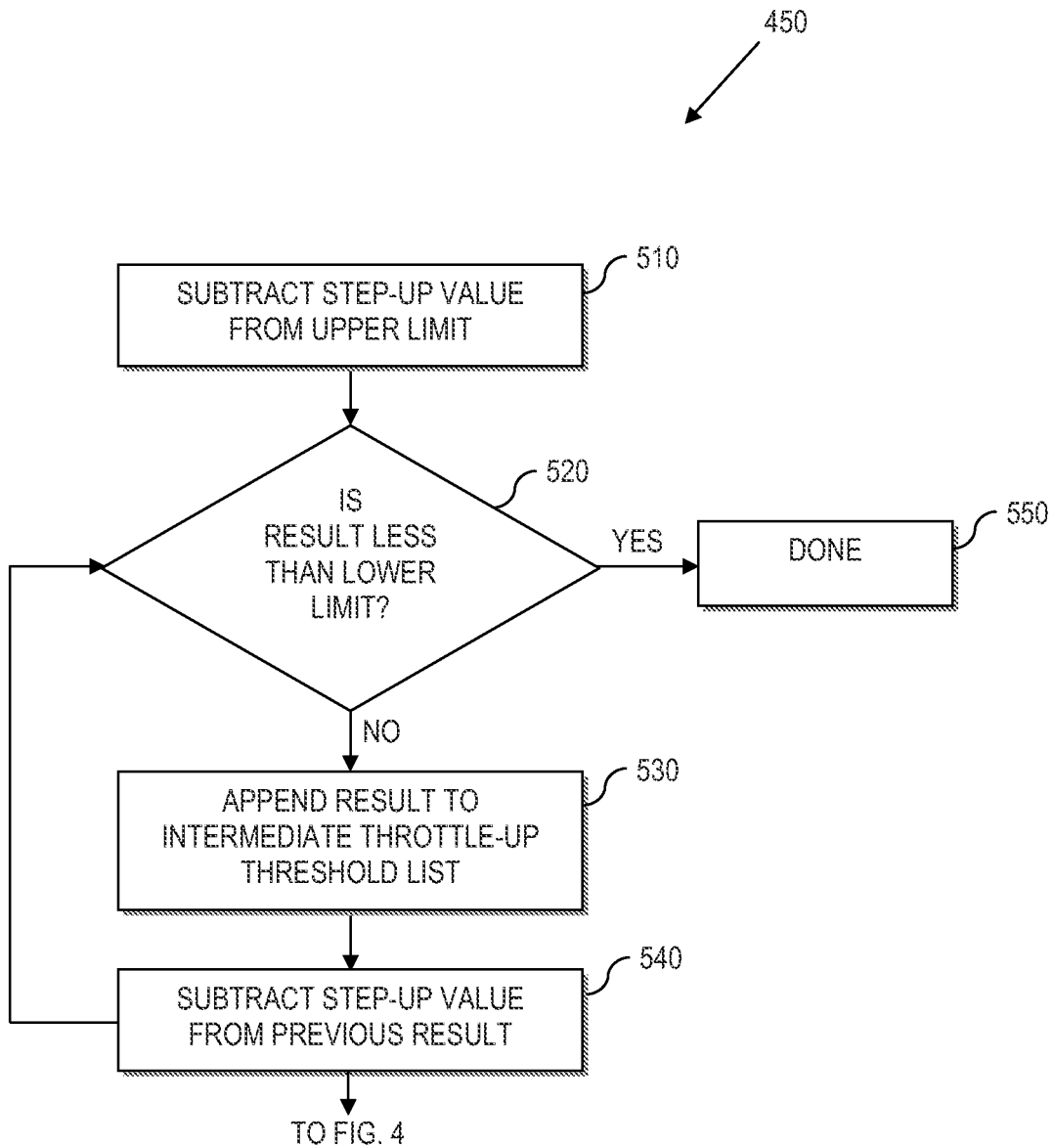
FIG. 5 is a flowchart illustrating a process for calculating intermediate throttle-up threshold values of the flowcharts of FIGS. 2 and 4, according to various aspects of the present invention.

Referring now to FIG. 5, an exemplary detailed flowchart depicting a process for calculating the intermediate throttle-up thresholds (element 450) is shown. At 510, the messaging engine subtracts the step-up value from the upper limit. At 520, if the result of the subtraction at 510 is not less than the lower limit, then the messaging engine appends the result to a list of intermediate throttle-up threshold values at 530 and subtracts the step-up value from the previous result at 540. The loop of 520-540 continues until the result of the subtraction is less than the lower limit, wherein the calculation is done at 550.

Other methods may be used to determine the intermediate throttle-up thresholds. For example, if the step-up value is relative to the upper and lower limits, then an equation or formula may be used to create the intermediate throttle-up threshold values.

As another example, the messaging engine may calculate the intermediate throttle-up threshold values dynamically. For example, if the upper limit is 1000 MB and the step-up value is 20 MB, then once the total heap usage is 1000 MB, the messaging engine calculates the throttle-up value as 980 MB (i.e., 1000−20). After the total heap usage reaches 980 MB, the messaging engine can then calculate a new throttle-up value of 960 MB (i.e., 980−20). Thus, every time the total heap usage crosses the current intermediate throttle-up threshold, a new intermediate throttle-up threshold value is calculated. Also, if the current total heap usage rises to the level of crossing an intermediate throttle-back threshold, then a new intermediate throttle-up threshold value may be calculated.

As with all of the flowcharts in this document, the elements 510-550 of the process 450 of FIG. 5 do not necessarily need to be performed in the order shown in the flowchart. Also, some of the elements may be performed in parallel (i.e., at the same time).

Figure 6:
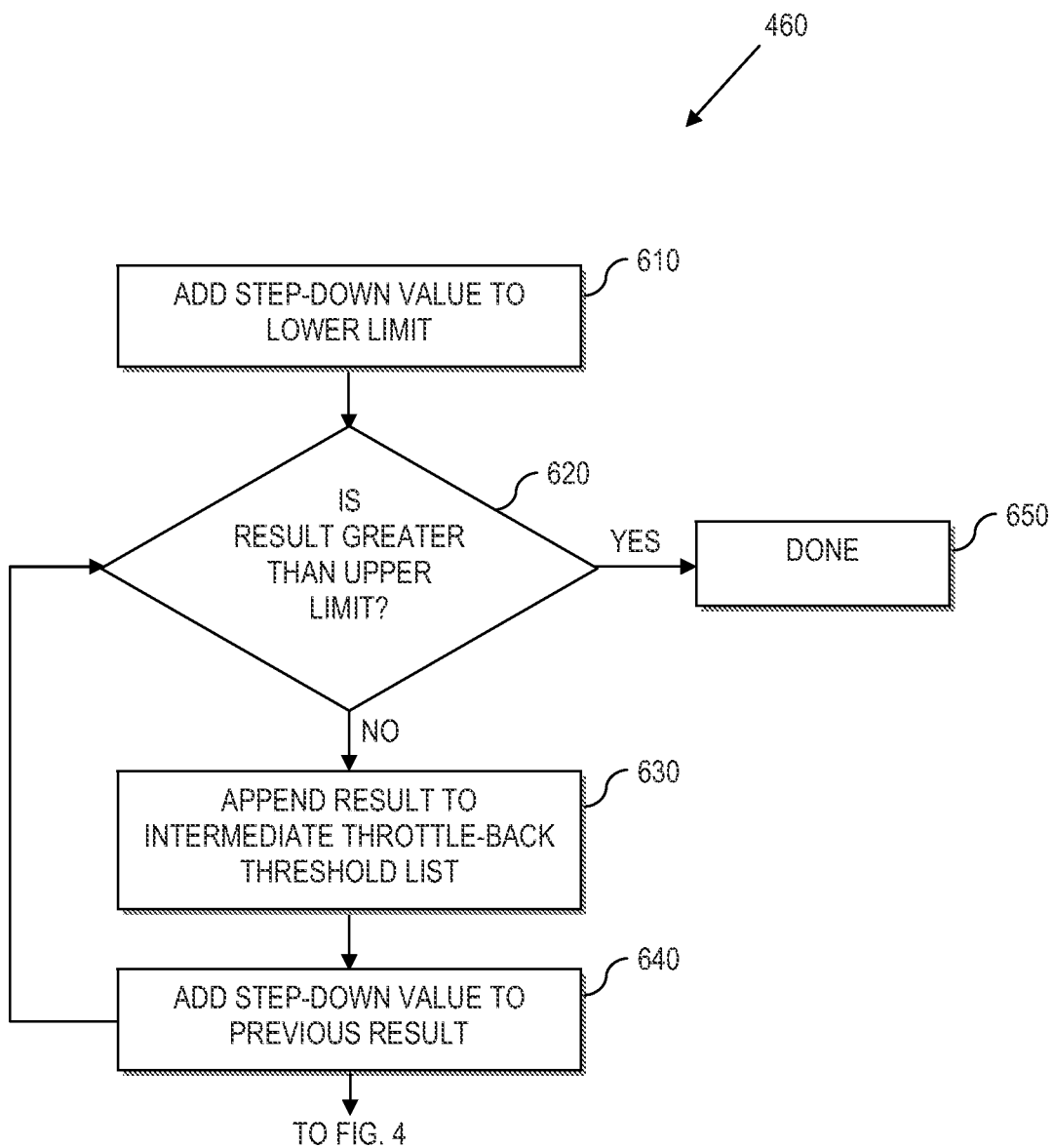
FIG. 6 is a flowchart illustrating a process for calculating intermediate throttle-back threshold values of the flowcharts of FIGS. 2 and 4, according to various aspects of the present invention.

Referring now to FIG. 6, an exemplary detailed flowchart depicting a process for calculating the intermediate throttle-back thresholds (element 460) is shown. At 610, the messaging engine adds the step-down value to the lower limit. At 620, if the result of the addition at 610 is not greater than the upper limit, then the messaging engine appends the result to a list of intermediate throttle-back threshold values at 630 and adds the step-down value to the previous result at 640. The loop of 620-640 continues until the result of the addition is greater than the upper limit, wherein the calculation is done at 650.

Other methods may be used to determine the intermediate throttle-back thresholds. For example, if the step-down value is relative to the upper and lower limits, then an equation or formula may be used to create the intermediate throttle-back threshold values.

As another example, the messaging engine may calculate the intermediate throttle-back threshold values dynamically. For example, if the lower limit is 700 MB and the step-down value is 20 MB, then once the total heap usage is 700 MB, the messaging engine calculates the throttle-back value as 720 MB (i.e., 700+20). After the total heap usage reaches 720 MB, the messaging engine can then calculate a new throttle-back value of 740 MB (i.e., 720+20). Thus, every time the total heap usage crosses the current intermediate throttle-back threshold, a new intermediate throttle-back threshold value is calculated. Also, if the current total heap usage falls to the level of crossing an intermediate throttle-up threshold, then a new intermediate throttle-back threshold value may be calculated.

As with all of the flowcharts in this document, the elements 610-650 of the process 460 of FIG. 6 do not necessarily need to be performed in the order shown in the flowchart. Also, some of the elements may be performed in parallel (i.e., at the same time).

Figure 7:
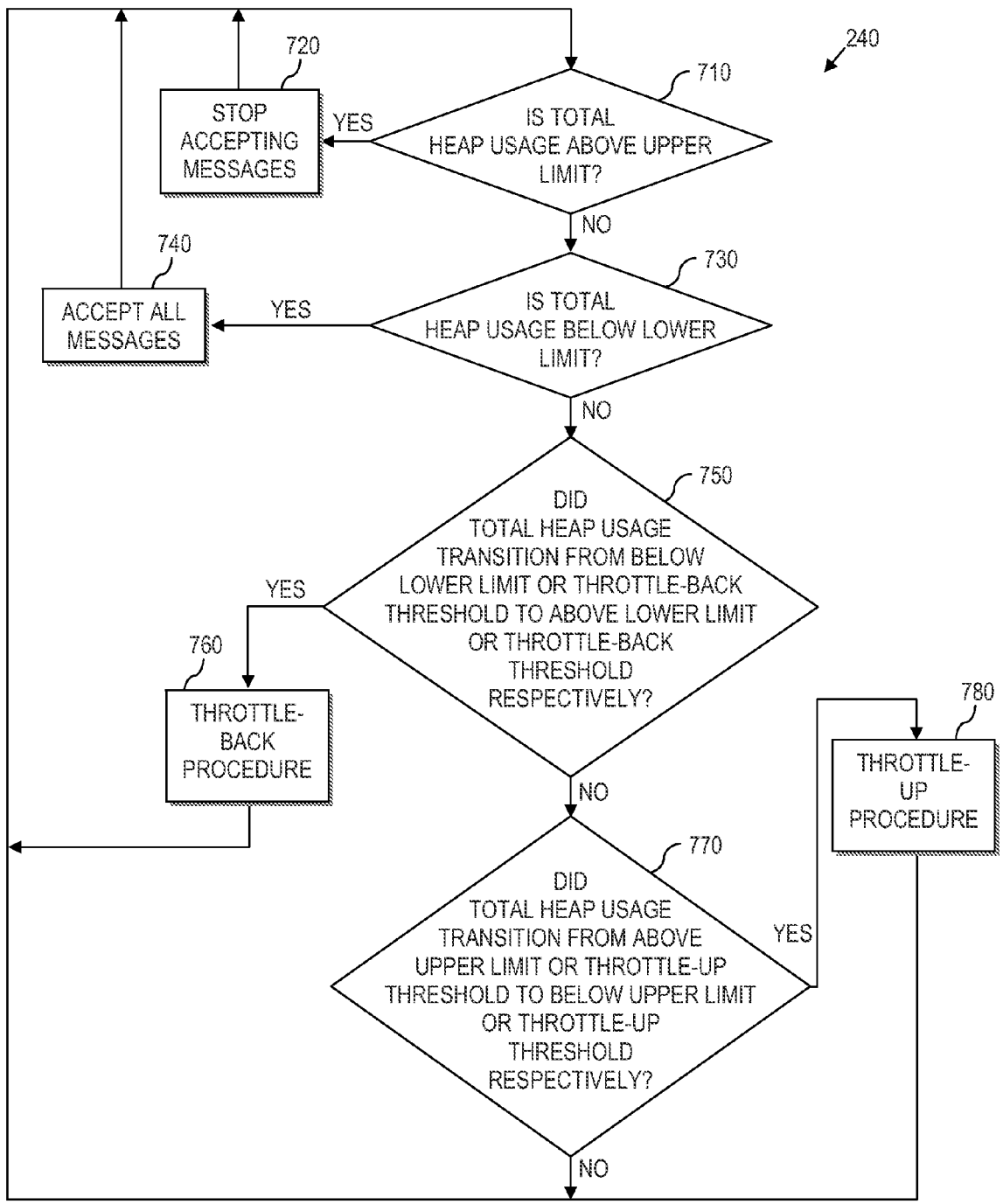
FIG. 7 is a flowchart illustrating a process for controlling message production of the flowchart of FIG. 2, according to various aspects of the present invention.

Referring to FIG. 7, an exemplary detailed flowchart depicting a process for controlling message production based on the parameters and the total heap usage (element 240) is shown. At 710, the messaging engine determines if the total heap usage is above the upper limit. If so, then the messaging engine stops accepting any messages from producers at 720. However, if the total heap usage is not above the upper limit, then at 730, the messaging engine determines if the total heap usage is below the lower limit. If so, then the messaging engine accepts all messages from all producers (i.e., the messaging engine removes all throttling restrictions) at 740.

However, if the total heap usage is between the upper limit and the lower limit, then at 750 the messaging engine determines if the total heap usage has risen from below the lower limit to above the lower limit or if the total heap usage has risen from below an intermediate throttle-back threshold to above that intermediate throttle-back threshold. If so, then at 760 the messaging engine performs a throttle-back procedure, which is described in greater detail in reference to FIG. 8 below.

At 770 the messaging engine determines if the total heap usage has fallen from above the upper limit to below the upper limit or if the total heap usage has fallen from above an intermediate throttle-back threshold to below that intermediate throttle-back threshold. If so, then at 780 the messaging engine performs a throttle-up procedure, which is described in greater detail in reference to FIG. 9 below.

If none of the decisions 710, 730, 750, 770 are true, then the messaging engine does not adjust the throttling of message acceptance/production. This method 240 can run continuously or discretely (e.g., at certain time intervals, at a certain event, whenever the messaging engine receives new total heap usage information, etc.).

As with all of the flowcharts in this document, the elements 710-780 of the process 240 of FIG. 7 do not necessarily need to be performed in the order shown in the flowchart. Also, some of the elements may be performed in parallel (i.e., at the same time).

Figure 8:
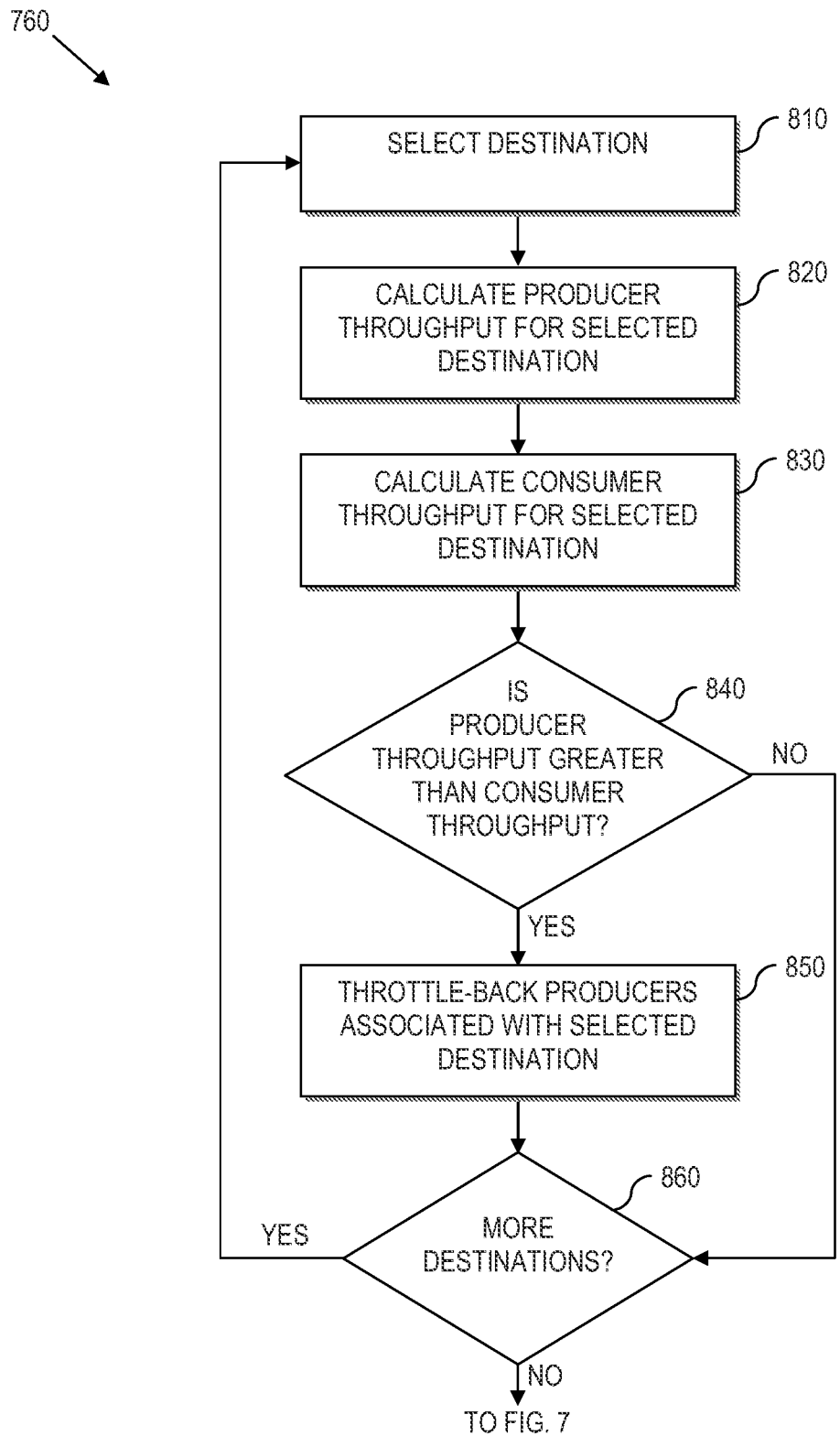
FIG. 8 is a flowchart illustrating a throttle-back procedure of FIGS. 2 and 7, according to various aspects of the present invention.

Referring now to FIG. 8, an exemplary detailed flowchart depicting the throttle-back procedure (element 760) is shown. At 810, the messaging entity selects a destination from the list of destinations (created at element 210 in FIG. 2), and at 820 and 830, the messaging engine calculates an aggregate producer throughput for the selected destination and an aggregate consumer throughput for the selected destination, respectively. Usually, the throughputs are calculated over a certain period of time (e.g., the time-window parameter received at element 220 in FIG. 2). An example equation for calculating the producer throughput is:

$$\text{ProducerThroughput} = (\text{Number of messages produced for selected destination during time-window})/\text{time-window}$$

where the number of messages produced for selected destination during time-window can be calculated by subtracting the number of messages produced for the destination since the last time-window from the total number of messages produced for the destination.

An example equation for calculating the consumer throughput is:

$$\text{ConsumerThroughput} = (\text{Number of messages consumed by selected destination during time-window})/\text{time-window}$$

where the number of messages consumed by selected destination during time-window can be calculated by subtracting the number of messages consumed by the destination since the last time-window from the total number of messages consumed by the destination.

At 840, the messaging engine determines if the ProducerThroughput is greater than the ConsumerThroughput. If so, then at 850, the messaging engine throttles back the producers associated with the selected destination. For example, if there are three producers producing messages for the selected destination, then those three producers may be throttled back. An example equation for determining the throttle rate is:

$$\text{ThrottleRate}_{Producer\_x} = (\text{Throughput}_{Producer\_x} * \text{ProducerThroughput})/(\text{ConsumerThroughput})$$

However, other equations to determine the throttling rate may be used.

At 860, the messaging engine repeats the process 760 for the rest of the destinations on the list. Thus, if there are five destinations on the list from element 220, then the process 760 is performed five times.

As with all of the flowcharts in this document, the elements 810-860 of the process 760 of FIG. 8 do not necessarily need to be performed in the order shown in the flowchart. Also, some of the elements may be performed in parallel (i.e., at the same time). For example, the process 760 can be performed once for every time-window and the results published for other processes within method 200 to access.

Figure 9:
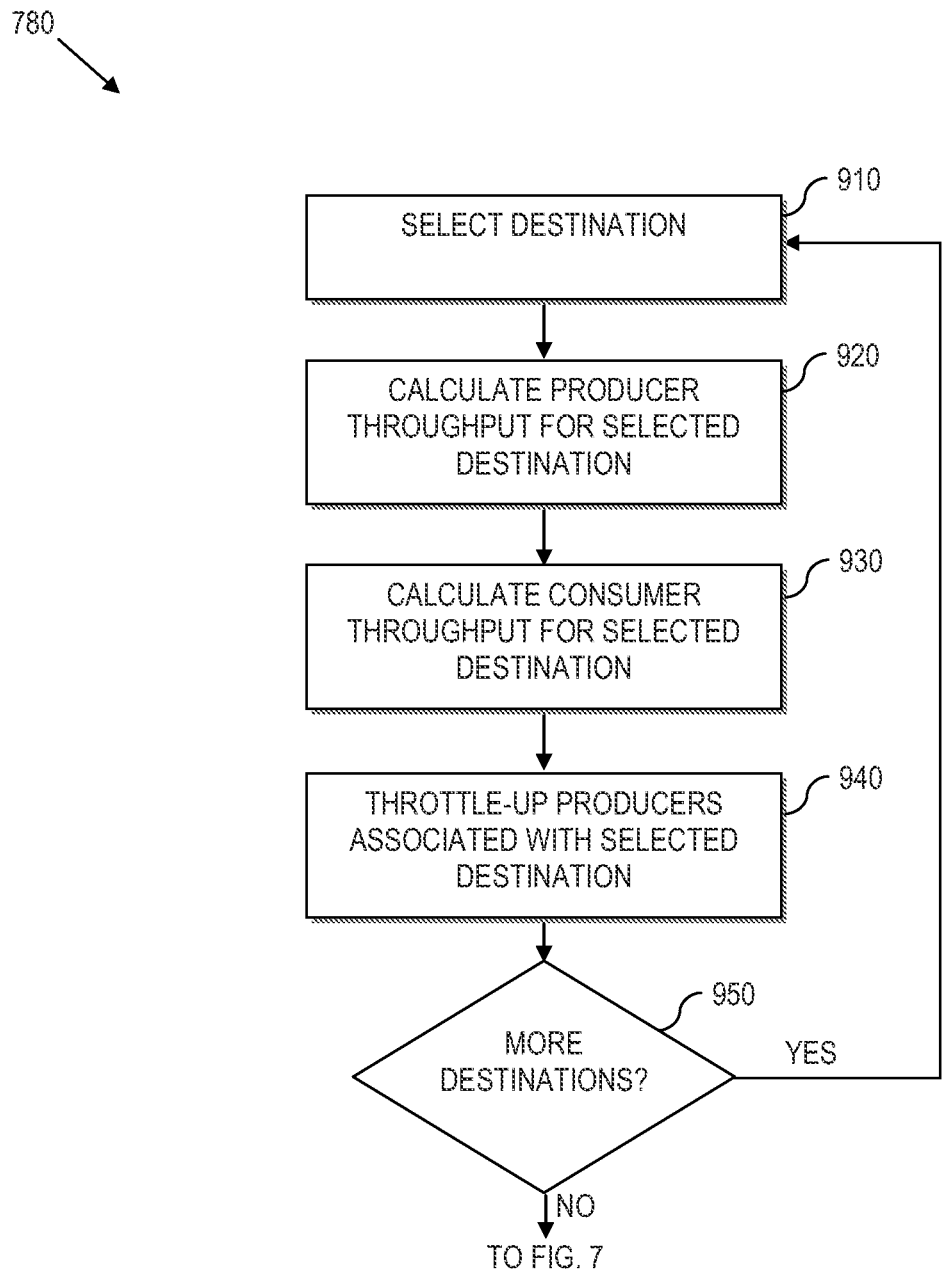
FIG. 9 is a flowchart illustrating a throttle-up procedure of FIGS. 2 and 7, according to various aspects of the present invention.

Referring now to FIG. 9, an exemplary detailed flowchart depicting the throttle-back procedure (element 780) is shown. At 910, the messaging entity selects a destination from the list of destinations (created at element 210 in FIG. 2), and at 920 and 930, the messaging engine calculates an aggregate producer throughput for the selected destination and an aggregate consumer throughput for the selected destination, respectively. Usually, the throughputs are calculated over a certain period of time (e.g., the time-window parameter received at element 220 in FIG. 2). An example equation for calculating the producer throughput is:

$$\text{ProducerThroughput}=(\text{Number of messages produced for selected destination during time-window})/\text{time-window}$$

where the number of messages produced for selected destination during time-window can be calculated by subtracting the number of messages produced for the destination since the last time-window from the total number of messages produced for the destination.

An example equation for calculating the consumer throughput is:

$$\text{ConsumerThroughput}=(\text{Number of messages consumed by selected destination during time-window})/\text{time-window}$$

where the number of messages consumed by selected destination during time-window can be calculated by subtracting the number of messages consumed by the destination since the last time-window from the total number of messages consumed by the destination.

At 940, the messaging engine throttles up the producers associated with the selected destination. For example, if there are three producers producing messages for the selected destination, then those three producers may be throttled up. An example equation for determining the throttle rate is:

$$\text{ThrottleRate}_{Producer\_x}=(\text{Throughput}_{Producer\_x} * \text{ProducerThroughput})/(\text{ConsumerThroughput})$$

However, other equations to determine the throttling rate may be used.

At 950, the messaging engine repeats the process 760 for the rest of the destinations on the list. Thus, if there are five destinations on the list from element 220, then the process 760 is performed five times.

As with all of the flowcharts in this document, the elements 910-950 of the process 780 of FIG. 9 do not necessarily need to be performed in the order shown in the flowchart. Also, some of the elements may be performed in parallel (i.e., at the same time). For example, the process 780 can be performed once for every time-window and the results published for other processes within method 200 to access. Further, if the process 760 of FIG. 8 publishes the ProducerThroughput and ConsumerThroughput results, then there may be no need to recalculate those values for process 780.

A non-limiting example of the process of FIGS. 2-9 is provided: A messaging engine starts up and has at least two parallel threads. The first thread is a ProducerThrottlingThread, which monitors the total heap usage compared to the parameters associated with the heap, and the second thread is a SnapshotThroughputThread, which monitors the throughput of the consumers and producers over a period of time.

The messaging engine creates a list of all destinations associated with itself, where those destinations have at least a producer or a consumer associated with the destination (210, FIG. 3). In this case, there are five destinations, and all of the destinations are associated with a consumer or producer, so the list has five destinations.

The messaging engine receives parameters associated with the heap (220, FIG. 4). In this case, the parameters are directly passed as: upper limit=1000 MB, lower limit=700 MB, step-up value=20 MB, step-down value=20 MB, and time window=10 seconds. The messaging engine calculates intermediate throttle-up threshold values of 720 MB, 740 MB, 760 MB . . . 980 MB (450, FIG. 5). In this case, the intermediate throttle-back threshold values are identical to the intermediate throttle-up threshold values (460, FIG. 6).

The ProducerThrottlingThread monitors heap usage (240, FIG. 7). In parallel, the SnapshotThroughputThread monitors the throughput for the consumers and producers (820 and 830 FIG. 8; 920 and 930 FIG. 9) and publishes those values for the messaging engine to use; in this case, new values are published every 10 seconds (i.e., the time window, above).

When starting out, the total heap usage is below the lower limit; thus, the messaging engine allows all producers to produce messages freely and accepts all messages.

When the ProducerThrottlingThread detects that the total heap usage rises above the lower limit (750, FIG. 7), then it alerts the messaging engine, which starts the throttle-back procedure (760, FIG. 8). The messaging engine selects Destination_1 and reads the throughput values published by the SnapshotThroughputThread. At this time, the producer throughput is less than the consumer throughput, so the messaging engine does nothing to the producers producing messages for Destination_1. Then, the messaging engine selects Destination_2, and in this example, Destination_2 has a ProducerThroughput value greater than its ConsumerThroughput value. Therefore, the messaging engine reads the throttle rates published by the SnapshotThroughputThread for the producers associated with Destination_2 and applies those throttling rates to those destinations. In this example, Destinations_3 and _4 have ConsumerThroughputs equal to the ProducerThroughputs, so no throttling is required for those destinations at the present moment.

When the ProducerThrottlingThread detects that the total heap usage rises above the first intermediate throttle-back threshold value (750, FIG. 7) (i.e., 720 MB), then it alerts the messaging engine, which starts the throttle-back procedure (760, FIG. 8). The messaging engine selects Destination_1 and reads the throughput values published by the SnapshotThroughputThread. At this time, the producer throughput is less than the consumer throughput, so the messaging engine selects Destination_2, which at this time has an equal ProducerThroughput value and ConsumerThroughput value. The messaging engine moves on to Destination_3, which has a ProducerThroughput value greater than its ConsumerThroughput value. Therefore, the messaging engine reads the throttle rates published by the SnapshotThroughputThread for the producers associated with Destination_3 and applies those throttling rates to those destinations. Destination_4 also has a ProducerThroughput value greater than its ConsumerThroughput value. Therefore, the messaging engine reads the throttle rates published by the SnapshotThroughputThread for the producers associated with Destination_4 and applies those throttling rates to those destinations.

When the ProducerThrottlingThread detects that the total heap usage falls below the first intermediate throttle-up threshold value (750, FIG. 7), then it alerts the messaging engine, which starts the throttle-up procedure. Producers producing messages for Destination_1 do not have any throttling restrictions, so the producers producing messages for Destination_1 are not adjusted. However, producers producing messages for Destinations_2-4 have adjusted throttle rates, so the messaging engine applies the throttling rates calculated by the SnapshotThroughputThread to those producers.

This process continues indefinitely. At one point in the example, the total heap usage rises above the upper limit, and the messaging engine stops accepting all messages. At another point in the example, the total heap usage falls below the lower limit, and all throttling restrictions are removed.

Thus, according to various aspects of the present invention, producers may be throttled dynamically over a range between a lower limit and an upper limit. Further, various aspects of the present invention allow the producers to be throttled based on the total heap usage, not just on the throughputs of the producers and consumers. Also, the present invention throttles back producers that are associated with destinations that cannot keep up with the current producer throughput; the other producers in the system are left alone.

Figure 10:
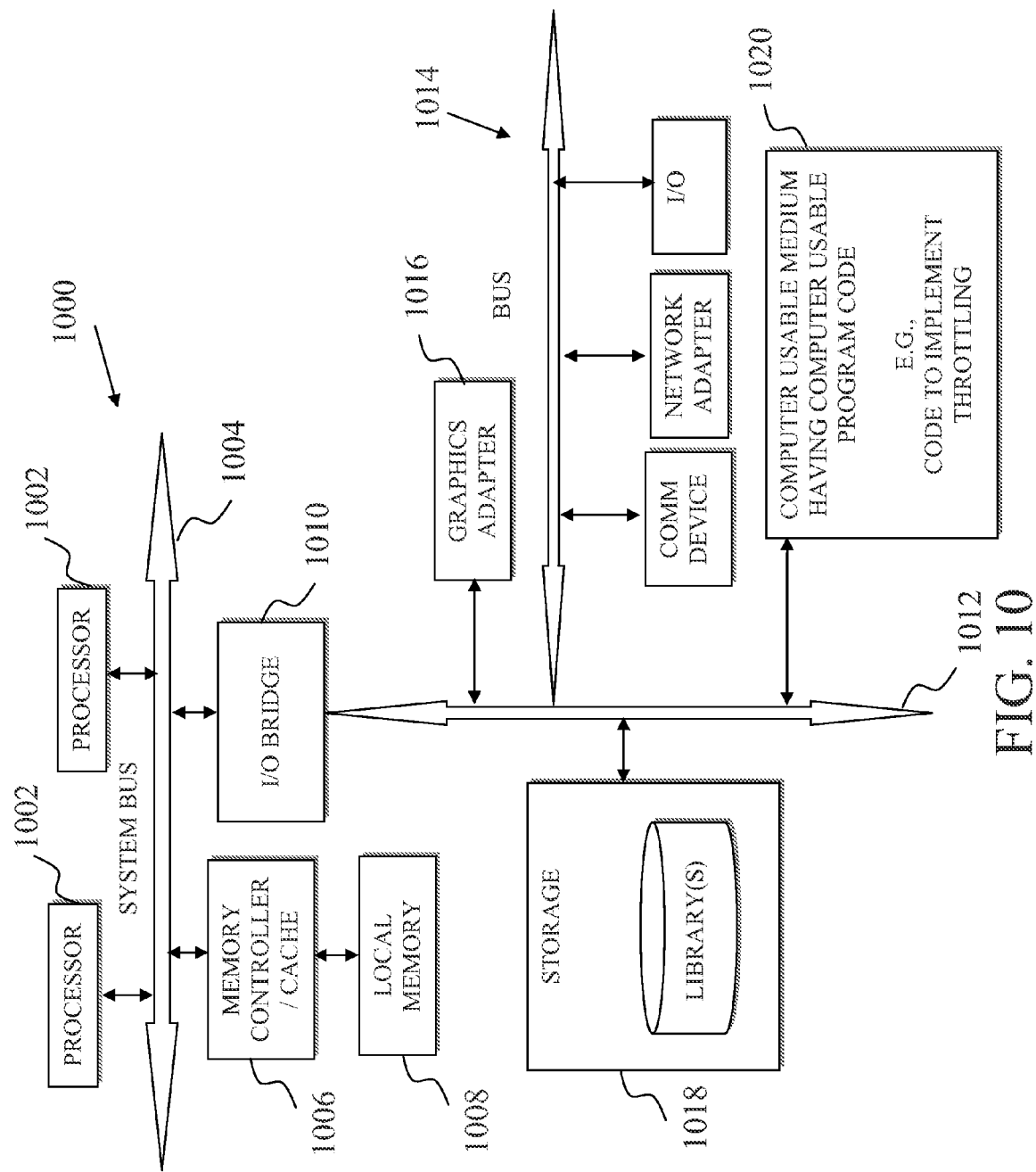
FIG. 10 is a block diagram of a computer system having a computer readable storage medium for implementing functions according to various aspects of the present invention as described in greater detail herein.

Referring to FIG. 10, a block diagram of a data processing system is depicted in accordance with the present invention. Data processing system 1000 may comprise a symmetric multiprocessor (SMP) system or other configuration including a plurality of processors 1002 connected to system bus 1004. Alternatively, a single processor 1002 may be employed. Also connected to system bus 1004 is memory controller/cache 1006, which provides an interface to local memory 1008. An I/O bus bridge 1010 is connected to the system bus 1004 and provides an interface to an I/O bus 1012. The I/O bus may be utilized to support one or more buses and corresponding devices 1014, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 1016, storage 1018, and a computer usable storage medium 1020 having computer usable program code embodied thereon. The computer usable program code may be executed to implement any aspect of the present invention, for example, to implement any aspect of any of the methods and/or system components illustrated in FIGS. 1-9.

The data processing system depicted in FIG. 10 may comprise, for example, an IBM RS/6000 system, a product of International Business Machines Corporation in Armonk, New York, running the Advanced Interactive Executive (AIX) operating system. An object oriented programming system such as Java may run in conjunction with the operating system and provides calls to the operating system from Java programs or applications executing on data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), a Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A method for a messaging engine to control messaging within a virtual machine having a heap, the method comprising:
creating a list of destinations associated with the messaging engine;
receiving parameters associated with the heap, including:
receiving an upper limit, which indicates a maximum heap usage where a heap usage above the upper limit indicates that message production is to be stopped;
receiving a lower limit, which indicates a minimum heap usage where a heap usage below the lower limit indicates that message production is to be unrestricted and a heap usage between the upper limit and the lower limit indicates that message production should be throttled back;
receiving a step-up value that indicates when message production is to be increased while the heap usage is below the upper limit;
receiving a step-down value that indicates when message production is to be decreased while the heap usage is above the lower limit;
calculating an intermediate throttle-back threshold based on the lower limit and the step-down value, wherein the intermediate throttle-back threshold is above the lower limit and a transition of the heap usage from below the intermediate throttle-back threshold to above the intermediate throttle-back threshold indicates that message production should be decreased; and
calculating an intermediate throttle-up threshold based on the upper limit and the step-up value, wherein the intermediate throttle-up threshold is below the upper limit and a transition of the heap usage from above the intermediate throttle-up threshold to below the intermediate throttle-up threshold indicates that message production should be increased;
determining, by a processor, a total heap usage of the virtual machine; and
controlling, by the processor, message production rates based on the parameters associated with the heap and the total heap usage.

2. The method of claim 1, wherein creating a list of destinations includes:
finding all destinations associated with a messaging engine;
associating producers with destinations on a per destination basis;
associating consumers with destinations on a per destination basis; and
removing, from the list, destinations that do not have a producer association and do not have a consumer association.

3. The method of claim 1, further including:
determining a producer throughput for each destination based on the producers associated with the destination; and
determining a consumer throughput for each destination based on the consumers associated with the destination;
wherein:
controlling message production rates is further based on the determined producer throughputs and the determined consumer throughputs.

4. The method of claim 3, wherein controlling message production rates further includes:
determining the destinations where the associated producer throughput for that destination is greater than the associated consumer throughput for that destination; and
decreasing message production for producers associated with the determined destinations if the total heap usage transitions to above a select one of:
the lower limit, and
the intermediate throttle-back threshold.

5. The method of claim 3, wherein controlling message production rates further includes:
- determining the destinations where the associated producer throughput for that destination is greater than the associated consumer throughput for that destination; and
- increasing message production for producers associated with the determined destinations if the total heap usage transitions to below a select one of:
  - the upper limit, and
  - the intermediate throttle-up threshold.

6. The method of claim 1, wherein controlling message production rates further includes:
- ceasing all message production if the total heap usage transitions above the upper limit.

7. The method of claim 1, wherein controlling message production rates further includes:
- allowing all producers to produce messages freely if the total heap usage transitions below the lower limit.

8. The method of claim 1, wherein receiving the step-up value and the step-down value comprise receiving one value and applying that value to both the step-up value and the step-down value.

9. The method of claim 1, wherein:
- calculating an intermediate throttle-up threshold further includes subtracting the step-up value from the upper limit in increments until reaching the lower limit, wherein each calculated increment is an intermediate throttle-up threshold; and
- calculating an intermediate throttle-back threshold further includes adding the step-down value to the lower limit in increments until reaching the upper limit, wherein each calculated increment is an intermediate throttle-back throttle up threshold.

10. Computer-readable hardware with an executable program for a message engine to control messaging within a virtual machine having a heap stored thereon, wherein the program instructs a processor to perform:
- creating a list of destinations associated with the messaging engine;
- receiving parameters associated with the heap, including:
  - receiving an upper limit, which indicates a maximum heap usage where a heap usage above the upper limit indicates that message production is to be stopped;
  - receiving a lower limit, which indicates a minimum heap usage where a heap usage below the lower limit indicates that message production is to be unrestricted and a heap usage between the upper limit and the lower limit indicates that message production should be throttled back;
  - receiving a step-up value that indicates when message production is to be increased while the heap usage is below the upper limit;
  - receiving a step-down value that indicates when message production is to be decreased while the heap usage is above the lower limit;
  - calculating an intermediate throttle-back threshold based on the lower limit and the step-down value, wherein the intermediate throttle-back threshold is above the lower limit and a transition of the heap usage from below the intermediate throttle-back threshold to above the intermediate throttle-back threshold indicates that message production should be decreased; and
  - calculating an intermediate throttle-up threshold based on the upper limit and the step-up value, wherein the intermediate throttle-up threshold is below the upper limit and a transition of the heap usage from above the intermediate throttle-up threshold to below the intermediate throttle-up threshold indicates that message production should be increased;
- determining, by a processor, a total heap usage of the virtual machine; and
- controlling, by the processor, message production rates based on the parameters associated with the heap and the total heap usage.

11. The computer-readable hardware of claim 10, wherein creating a list of destinations includes:
- finding all destinations associated with a messaging engine;
- associating producers with destinations on a per destination basis;
- associating consumers with destinations on a per destination basis; and
- removing, from the list, destinations that do not have a producer association and do not have a consumer association.

12. The computer-readable hardware of claim 10, wherein the program further instructs the processor to perform:
- determining a producer throughput for each destination based on the producers associated with the destination; and
- determining a consumer throughput for each destination based on the consumers associated with the destination;

wherein:
- controlling message production rates is further based on the determined producer throughputs and the determined consumer throughputs.

13. The computer-readable hardware of claim 12, wherein controlling message production rates further includes:
- determining the destinations where the associated producer throughput for that destination is greater than the associated consumer throughput for that destination; and
- decreasing message production for producers associated with the determined destinations if the total heap usage transitions to above a select one of:
  - the lower limit, and
  - the intermediate throttle-back threshold.

14. The computer-readable hardware of claim 12, wherein controlling message production rates further includes:
- determining the destinations where the associated producer throughput for that destination is greater than the associated consumer throughput for that destination; and
- increasing message production for producers associated with the determined destinations if the total heap usage transitions to below a select one of:
  - the upper limit, and
  - the intermediate throttle-up threshold.

15. The computer-readable hardware of claim 10, wherein controlling message production rates further includes:
- ceasing all message production if the total heap usage transitions above the upper limit.

16. The computer-readable hardware of claim 10, wherein controlling message production rates further includes:
- allowing all producers to produce messages freely if the total heap usage transitions below the lower limit.

17. The computer-readable hardware of claim 10, wherein receiving the step-up value and the step-down value comprise receiving one value and applying that value to both the step-up value and the step-down value.

18. The computer-readable hardware of claim 10, wherein:

calculating an intermediate throttle-up threshold further includes subtracting the step-up value from the upper limit in increments until reaching the lower limit, wherein each calculated increment is an intermediate throttle-up threshold; and calculating an intermediate throttle-back threshold further includes adding the step-down value to the lower limit in increments until reaching the upper limit, wherein each calculated increment is an intermediate throttle-back threshold.

\* \* \* \* \*